United States Patent
Zhang et al.

(10) Patent No.: US 6,466,458 B2
(45) Date of Patent: Oct. 15, 2002

(54) ASYMMETRICAL FULL BRIDGE DC-TO-DC CONVERTER

(75) Inventors: Alpha J. Zhang; Guisong Huang; Yilei Gu, all of Shanghai (CN)

(73) Assignee: Delta Electronics, Inc., Taipei (TW)

( * ) Notice: Subject to any disclaimer, the term of this patent is extended or adjusted under 35 U.S.C. 154(b) by 0 days.

(21) Appl. No.: 09/782,573

(22) Filed: Feb. 12, 2001

(65) Prior Publication Data

US 2002/0136032 A1 Sep. 26, 2002

(51) Int. Cl.[7] ............ H02M 3/335; H02H 7/122
(52) U.S. Cl. ............ 363/17; 363/58; 363/132; 363/56.02
(58) Field of Search ............ 363/17, 58, 56.02, 363/98, 132

(56) References Cited

U.S. PATENT DOCUMENTS

| | | | | |
|---|---|---|---|---|
| 5,245,520 A | * | 9/1993 | Imbertson | 363/17 |
| 5,654,880 A | * | 8/1997 | Brkovic et al. | 363/17 |
| 5,936,857 A | * | 8/1999 | Jacobs et al. | 363/48 |
| 6,208,529 B1 | * | 3/2001 | Davidson | 363/132 |

* cited by examiner

Primary Examiner—Bao Q. Vu
(74) Attorney, Agent, or Firm—Bo-In Lin

(57) ABSTRACT

An asymmetrical full bridge DC-to-DC converter comprises an asymmetrical full bridge circuit which includes main switches and auxiliary switches, a capacitor connected in series to the branch circuit of the auxiliary switches, and a transformer having a primary winding and a secondary winding. The primary winding of transformer is connected to the common point of each leg of the full bridge. A rectification circuit is connected at the secondary winding of the transformer to obtain dc voltage output. In operation, an asymmetrical control method is applied for these main switches and auxiliary switches. Main switches and auxiliary switches turn on and turn off compensatively. A linear control characteristic of output voltage to switching duty cycle and an optimal reset of the transformer core is achieved by this invention.

16 Claims, 12 Drawing Sheets

Asymmetrical full bridge DC-to-DC converter of this invention

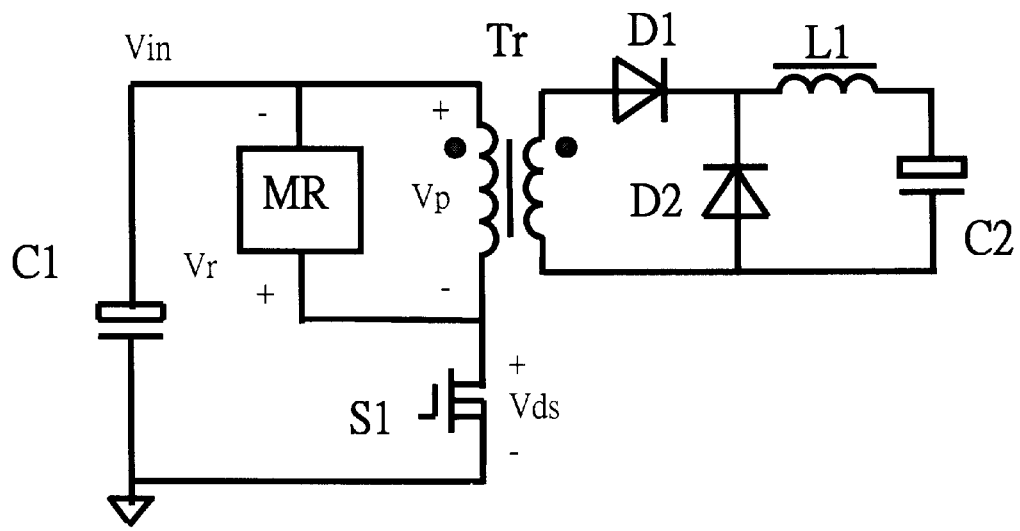
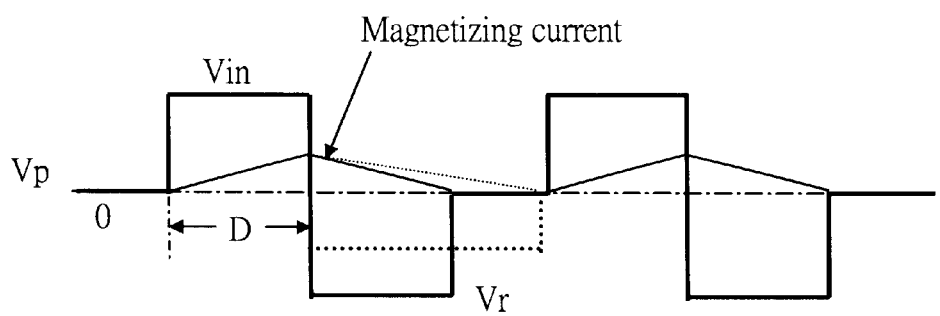
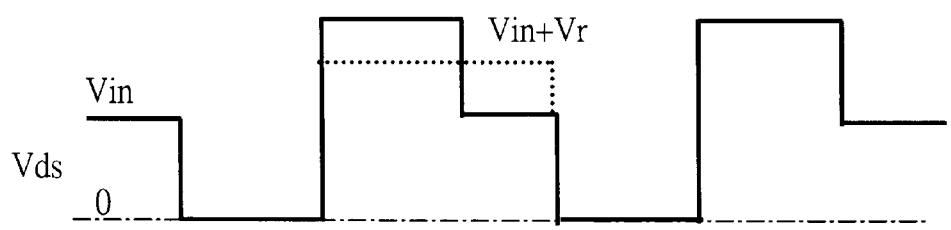
Fig.1 Prior art 1: Single-ended forward DC-to-DC converter

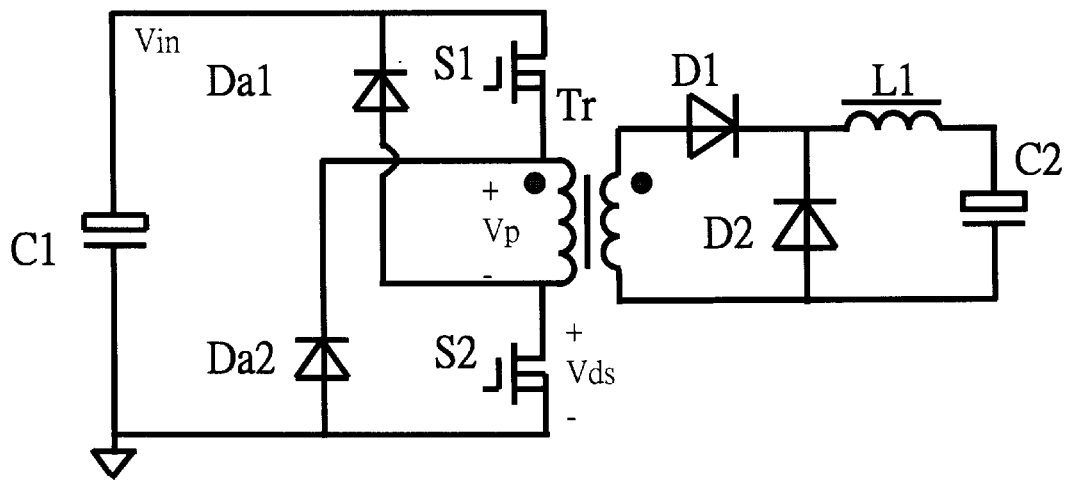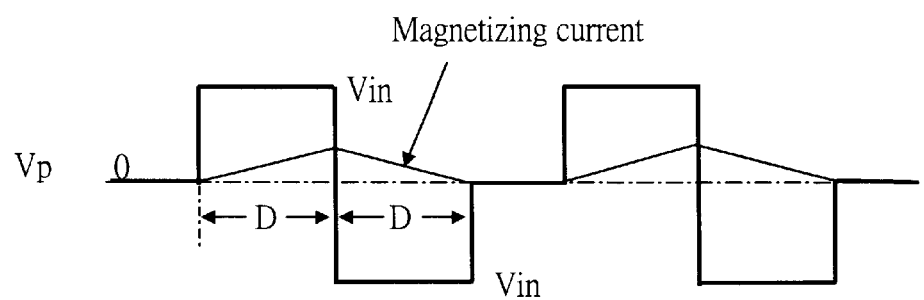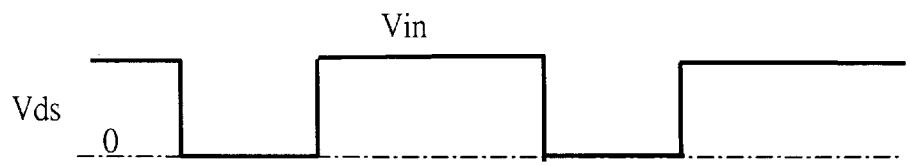
Fig.2 Prior art 2: Dual switch forward DC-to-DC converter

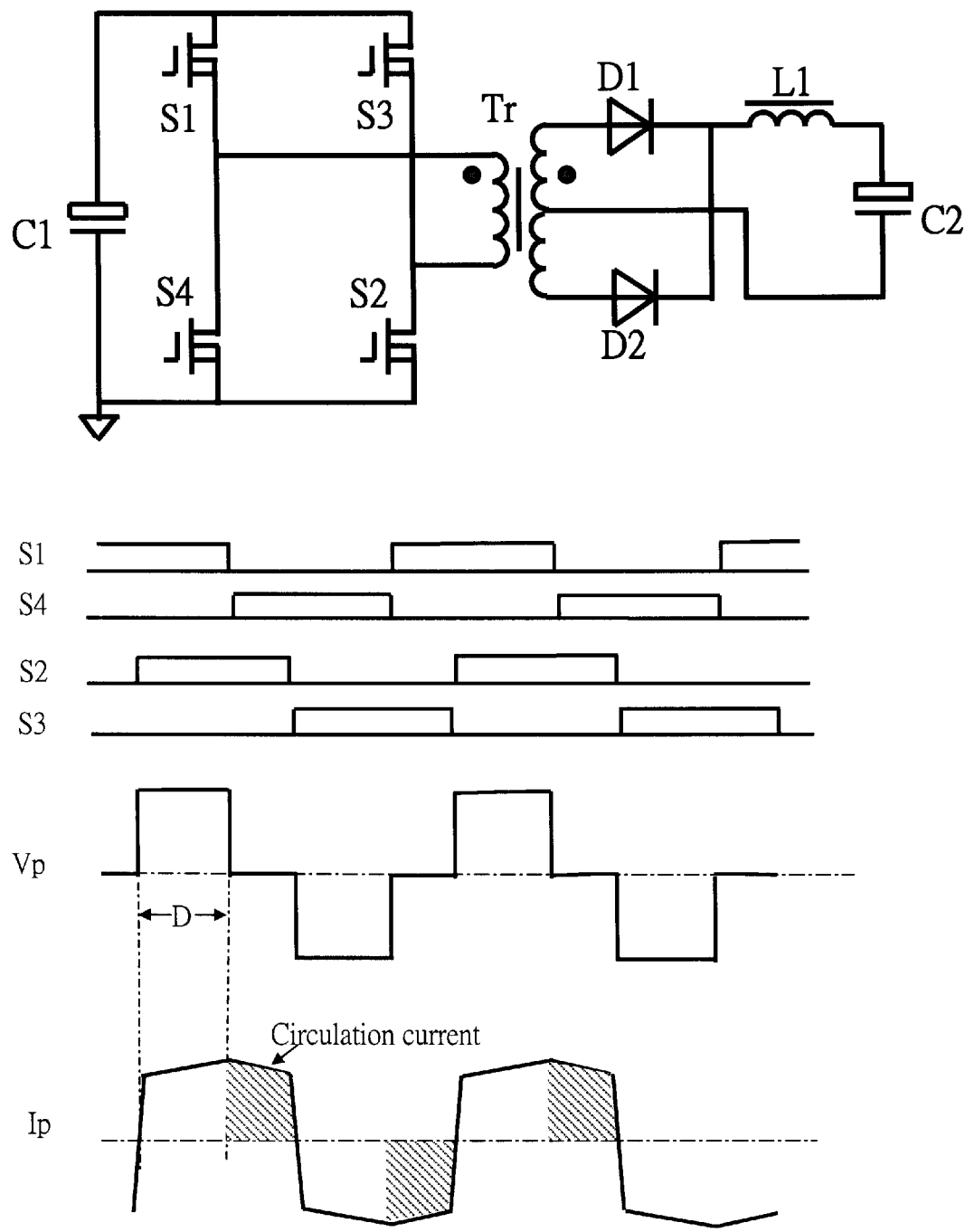
Fig.3 Prior art 3: Phase shift full bridge DC-to-DC converter

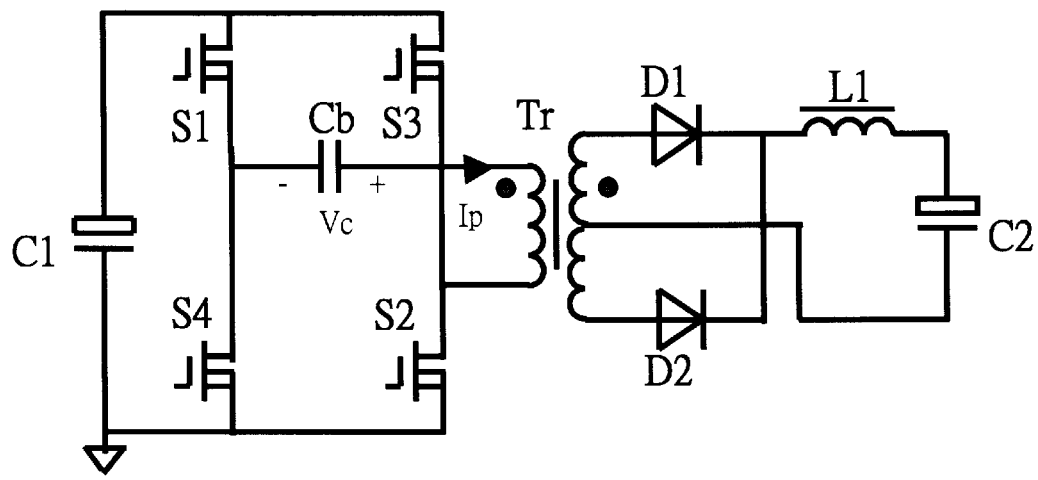
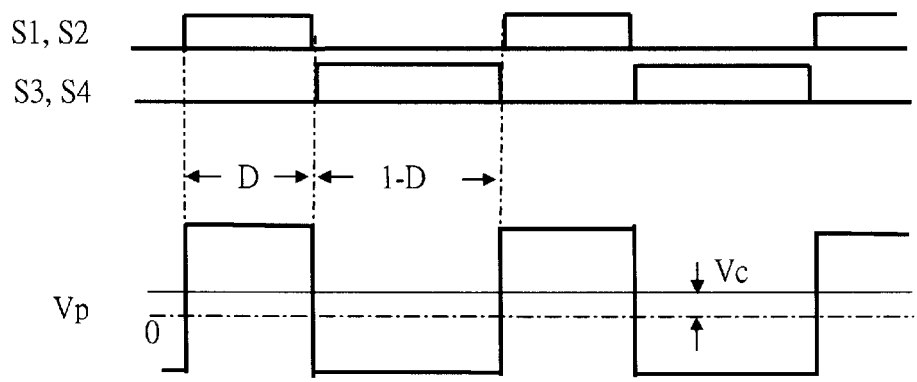
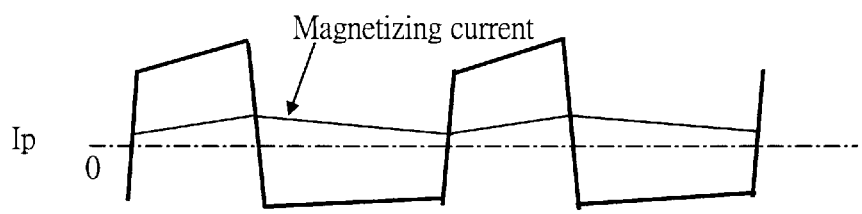
Fig.4 Prior art 4: Conventional asymmetrical full bridge DC-to-DC converter

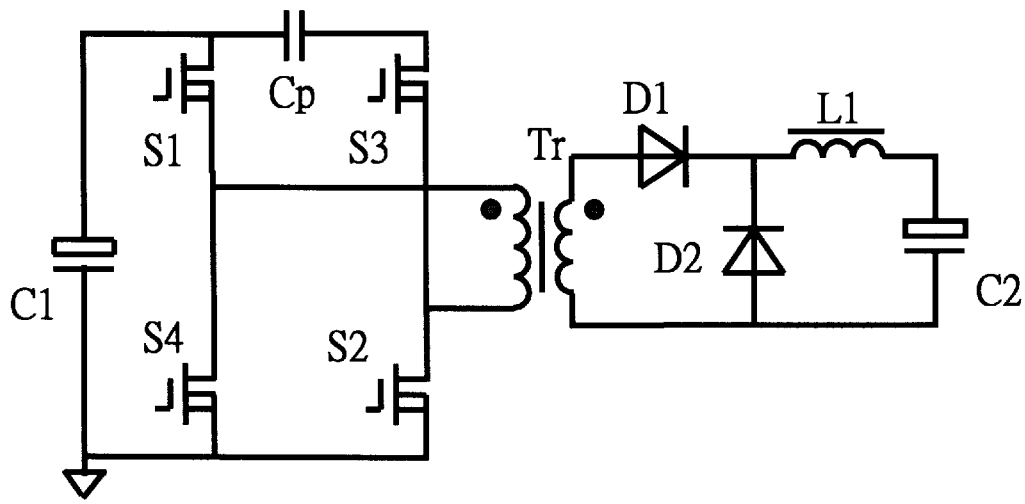
Fig.5 Asymmetrical full bridge DC-to-DC converter of this invention
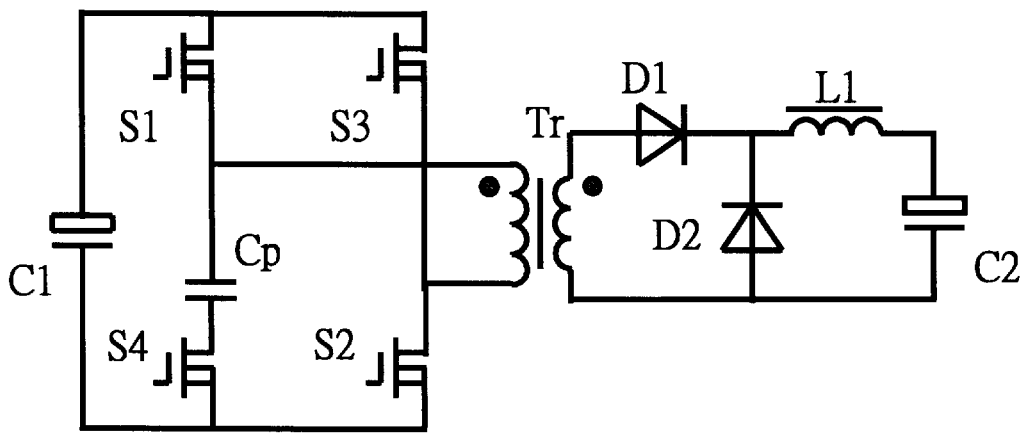
Fig.6 Another configuration of this invention

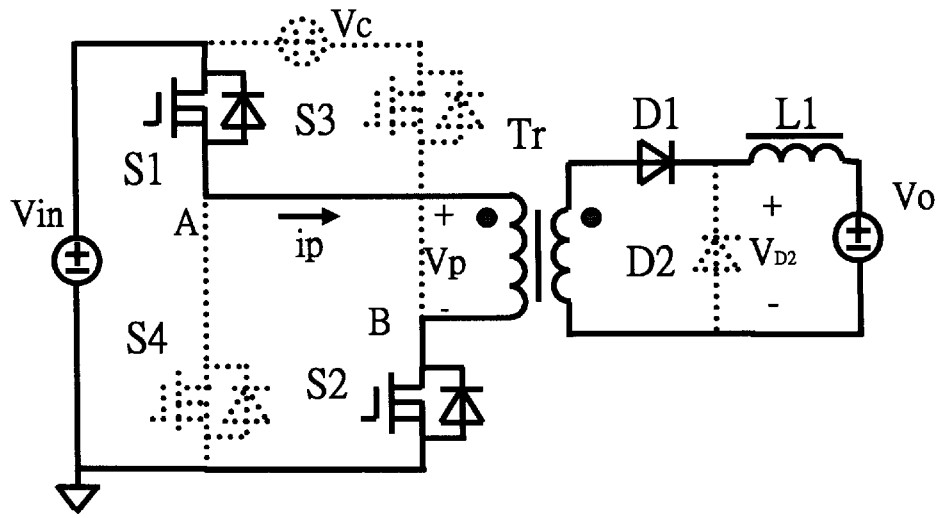
Fig.7 Equivalent circuit when main switches ON: Deliver energy from Vin to Vo
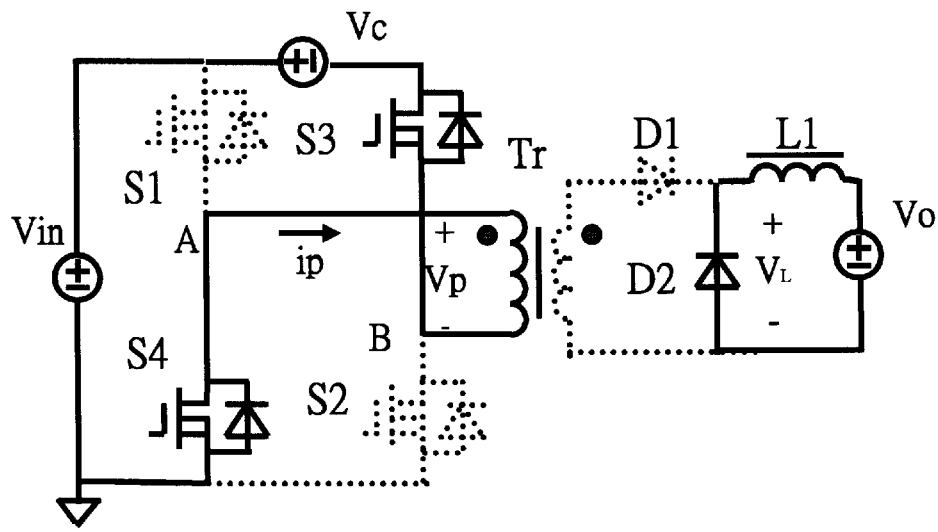
Fig.8 Equivalent circuit when auxiliary switch ON: Reset transformer core

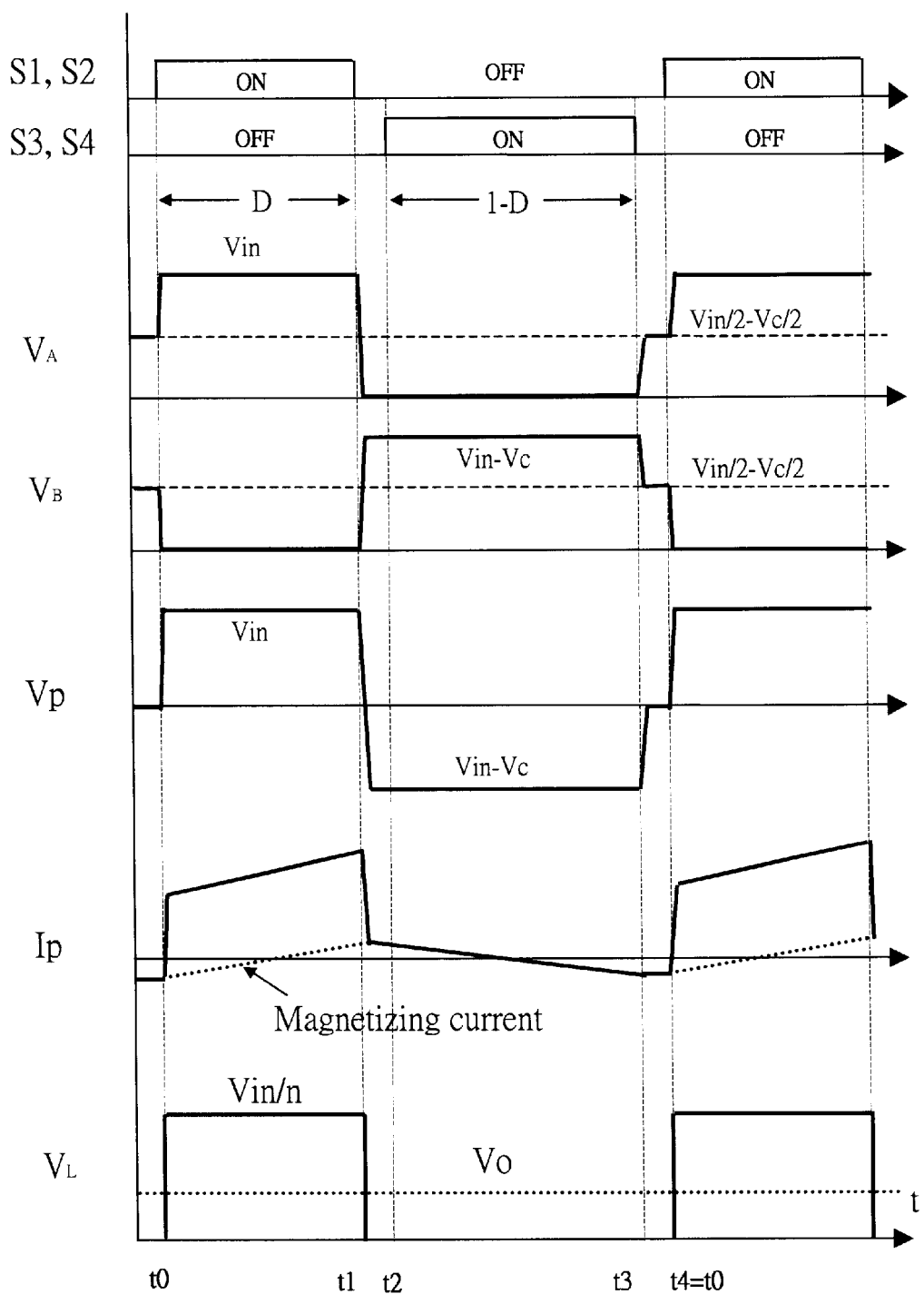
Fig.9 Key operation waveforms of Fig.5 of this invention

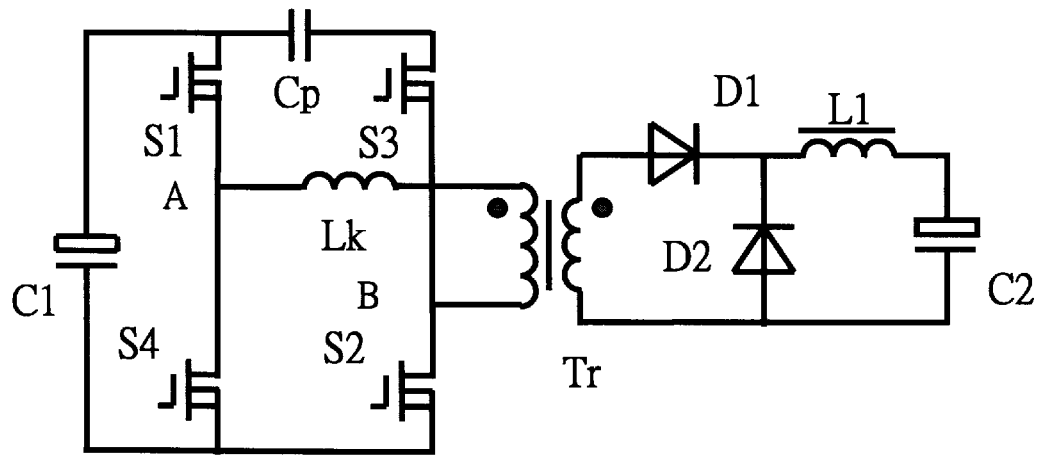
Fig.10 Obtain Zero-Voltage-Switching condition for main switches by inserting an inductor in primary side
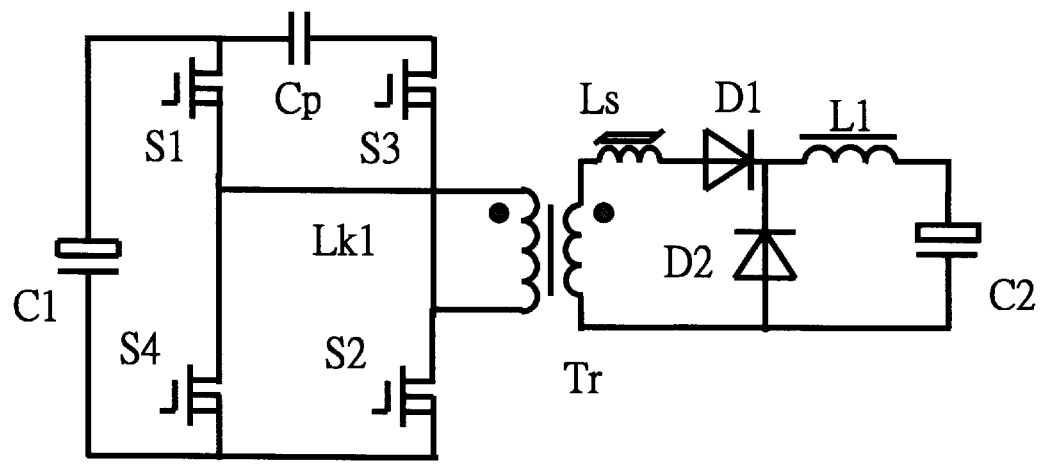
Fig.11 Obtain Zero-Voltage-Switching condition for main switches by inserting a saturable inductor in secondary side

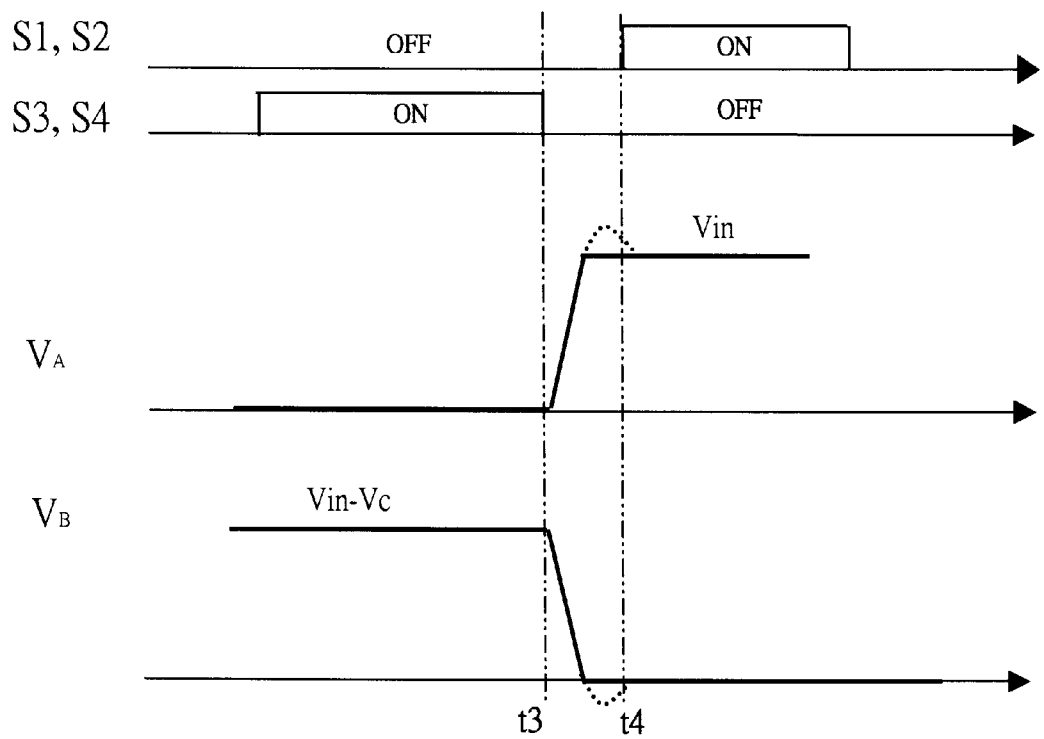
Fig.12 Zero-Voltage-Switching condition for main switches

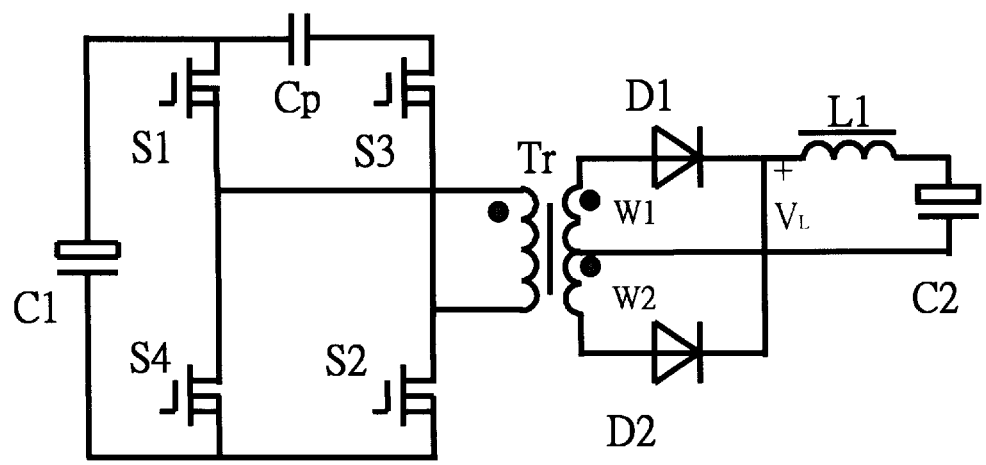
Fig.13 Center-tapped rectification circuit in secondary side to minimize output voltage ripple

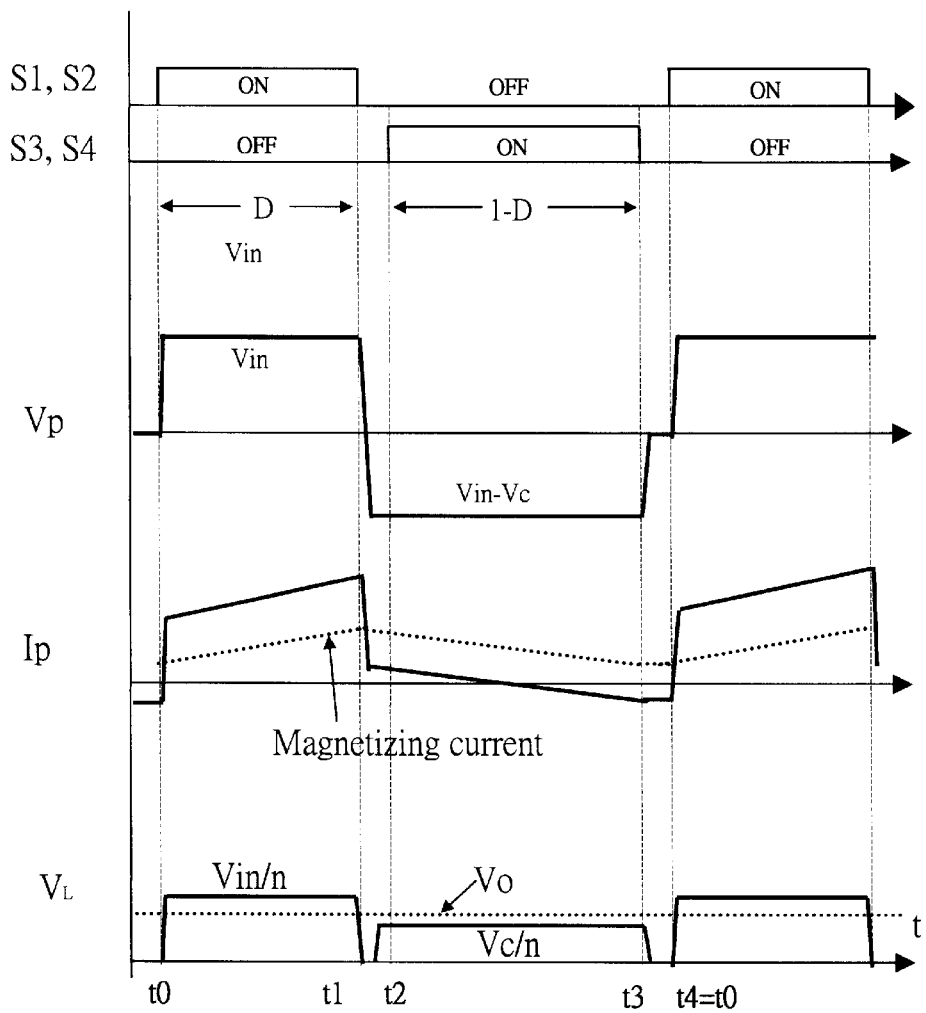
Fig.14 Key waveforms of this invention by employing center-tapped rectification circuit in secondary side

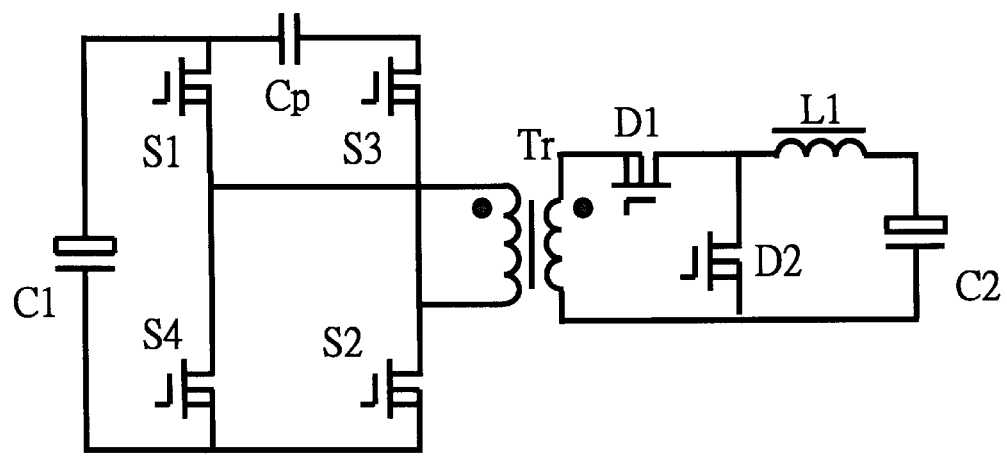
Fig.15 Synchronous rectification circuit in secondary side to improve rectifying efficiency

ASYMMETRICAL FULL BRIDGE DC-TO-DC CONVERTER

BACKGROUND OF THE INVENTION

1. Field of the Invention

This invention relates generally to the power supply systems that include DC-to-DC conversion operations. More particularly, this invention relates to an improved circuit design and configuration with an asymmetrical full bridge DC-to-DC converter with wide input voltage range.

2. Description of the Prior Art

Conventional art of design and manufacture of a DC-to-DC converter is still limited by lacking of an optimal topology that is suitable for high input voltage and wide input range operations.

FIG. 1 shows the configuration and key operation waveforms of single-ended forward DC-to-DC converter. In this type converter only one switch S1 is employed in the transformer primary side. When the switch S1 turns on, the transformer primary winding is connected to the input voltage Vin, the energy is delivered from source to load by the transformer coupling. When the switch S1 turns off, the transformer primary winding is connected to the magnetic reset circuit MR, which generates a negative voltage −Vr applying to the transformer primary winding and reset the magnetizing current to zero. In this process, the switch S1 must endure the voltage of Vin+Vr, which is much higher than input voltage. The magnetic reset circuit may be a RCD circuit, an auxiliary winding, or an active clamped circuit, of which the reset voltages are different according to the different circuit parameters. For general applications, the rated voltage of the switch S1 should be twice of input voltage. Due to higher rated voltage requirement for main switch, single-ended forward DC-to-DC converter is not suitable for high input voltage applications.

FIG. 2 shows the configuration and key operation waveforms of dual switch forward DC-to-DC converter. Two switches are employed in primary side. When the two switches turn on simultaneously, the transformer primary winding is connected to the input voltage and the energy is delivered from source to load. When the two switches turn off simultaneously, the magnetizing current passes by the two clamping diodes, which is denoted as Da1 and Da2 in FIG. 2. The input voltage is applied to primary winding reversely and reset magnetizing current to zero. Since the drain-to-source voltage of the switches is clamped by Da1 and Da2 to the input voltage, the switches only endure one time of the input voltage. This type converter is suitable for higher input voltage system.

However, the magnetic reset mechanism of dual switch forward converter is not optimal for wide input application. Since the reset voltage is equal to the input voltage, the reset time is also equal to the turn-on time of the switches in order to keep the voltage-second balance for transformer. With the decrease of the input voltage, the turn-on time should increase to output enough power. However, since the reset time also increases, the maximum duty cycle is limited within 50% in low input voltage. With the increase of the input voltage, the duty cycle becomes small and deteriorates the performance of the converter. By this reason this type converter is not suitable for wide input voltage applications.

In full-bridge type converter, four switches are employed in primary side, which turn on and turn off alternately to delivery the energy from source to load and keep the magnetic balance for transformer naturally. FIG. 3 shows a typical phase shift full bridge DC-to-DC converter. The key operation waveforms are shown in the figure as well.

In order to achieve the Zero-Voltage-Switching conditions for switches, phase-shift control logic is applied to four switches. Referring to FIG. 3, switches in each leg are driven by two compensative signals with fixed 50% duty cycle. That is, S1 and S4 turn on and turn off alternately, and S2 and S3 turn on and turn off alternately. The phase-shift of two legs is changeable. The overlap of S1 and S2 turn-on time is the effective duty cycle time for the transformer. So the output can be regulated by controlling the phase-shift of two legs.

It is easy to obtain the zero-voltage-switching condition for switches by using phase-shift control, however it brings out the circulation current problem. As shown in FIG. 3, in the time interval of S1 and S3 common turn-on or S2 and S4 common turn-on, the primary current circulates in primary switches and primary winding, and does not deliver energy to load. In wide input application, the effective duty cycle became smaller; the circulation current will cause larger conduction loss.

If the asymmetrical control logic is applied in full bridge structure, it also can regulate the output and obtain zero-voltage-switching for primary switches. FIG. 4 shows the conventional asymmetrical full bridge DC-to-DC converter and its key operation waveforms.

In FIG. 4, S1 and S2 turn on and turn off synchronously, S3 and S4 turn on and turn off synchronously. S1, S2 turn on with a duty cycle of D and S3 and S4 turn on with a duty cycle of 1-D. The block capacitor Cb, which is connected in series with the primary winding, offers a DC bias to keep the voltage-second balance for the transformer. Since both in S1, S2 turn-on and S3, S4 turn-on, the energy delivery process is going on, there is no more circulation current problem. But the magnetizing current has a DC bias, which will cause the trouble in transformer design. Another problem of this type converter is the non-linear control characteristic of output voltage to switching duty cycle. Duty cycle and conversion efficiency varies sharply with the variations of input and output voltage.

For the above reasons, a need still exists in the art of designing and manufacturing DC-to-DC converter to provide an optimal topology suitable for application to wide and high input voltage to accomplish several design objects. These design objects may include a goal of providing a DC-to-DC converter that imposes minimized voltage stress on switches, maximizes the switch duty cycle to ensure high conversion efficiency for wide operation range, and achieves soft-switching conditions for main switches. These design objects require new and improved converter configurations as will be described below.

SUMMARY OF THE PRESENT INVENTION

In the preferred embodiment of the present invention, an asymmetrical full bridge circuit is presented which is used in a DC-to-DC converter. The circuit comprises two main switches and two auxiliary switches, a compensative capacitor connected in series with the branch circuit of the auxiliary switches. One main switch and one auxiliary switch form one leg of the full bridge, and the other main switch and the other auxiliary switch form the other leg of the full bridge. The primary winding of the transformer is connected to the center points of two legs.

Two main switches turn on and turn off synchronously, and two auxiliary switches turn on and turn off synchronously also. When two main switches turn on, two auxiliary switches remains OFF and the energy is transferred from source to load, when two main switches turn off, two auxiliary switches turn on, and reset the transformer. The compensative capacitor offers a DC bias to keep the voltage-second balance for the transformer.

In the further embodiment of this invention, the asymmetrical full bridge circuit further includes an extra inductor that connects in series with the primary winding of the transformer. At the end of reset process, this inductor assists the main switches to obtain the zero-voltage-switching condition.

In the further embodiment of this invention, the asymmetrical full bridge circuit further includes a saturable inductor that connects in series with the secondary winding of the transformer. At the end of reset process, this saturable inductor assists the main switches to obtain the zero-voltage-switching condition.

This invention proposes a new topology for the design of DC-to-DC converter. The advantages of this topology are presented in following aspects. First, voltage stress of all the switches including main switches and auxiliary switches is equal to the input voltage or less than the input voltage. This topology can be used in high input applications. Second, the duty cycle of the main switches can be greater than 50% in low input, and in whole input range the duty cycle is maximized and keeps higher conversion efficiency in whole input range. So this topology is suitable for wide input applications. Third, the soft-switching condition is always satisfied for auxiliary switches, and can be obtain for main switches by properly circuit designing. So this topology is suitable for higher switching frequency applications.

In the other embodiment of this invention, an asymmetrical full bridge DC-to-DC converter includes an asymmetrical full bridge circuit with two main switches two auxiliary switches and a compensative capacitor, a transformer with a primary winding and a secondary winding, and a rectification circuit with two rectifiers and a output inductor. Wherein, the secondary has a tapping point. Each terminal of the secondary winding connects a rectifier, and each rectifier connects to the output inductor and further connects to one terminal of the load. The other terminal of the load connects to the tapping point of the secondary winding.

This topology not only has the advantages of preferred embodiment of the present invention, but also has the features that the output voltage ripple is minimized and a smaller output inductor is needed.

The objectives and advantages of the present invention will no doubt become obvious to those of ordinary skill in the prior art after having read the following detailed description of the preferred embodiment, which is illustrated in the various drawing figures.

BRIEF DESCRIPTION OF THE DRAWINGS

FIG. 1 Prior art 1: Single-ended forward DC-to-DC converter

FIG. 2 Prior art 2: Dual switch forward DC-to-DC converter

FIG. 3 Prior art 3: Phase shift full bridge DC-to-DC converter

FIG. 4 Prior art 4: Conventional asymmetrical full bridge DC-to-DC converter

FIG. 5 Asymmetrical full bridge DC-to-DC converter of this invention

FIG. 6 Another configuration of this invention

FIG. 7 Equivalent circuit when main switches ON: Deliver energy from source to load FIG. 8 Equivalent circuit when auxiliary switch ON: Reset transformer core FIG. 9 Key operation waveforms of this invention in FIG. 5

FIG. 10 Obtain zero-voltage-switching condition for main switches by inserting an inductor in primary side FIG. 11 Obtain zero-voltage-switching condition for main switches by inserting a saturable inductor in secondary side FIG. 12 Zero-voltage-switching condition for main switches FIG. 13 Center-tapped rectification circuit in secondary side to minimize output voltage ripple FIG. 14 Key waveforms of this invention by employing center-tapped rectification circuit in secondary side FIG. 15 Synchronous rectification circuit in secondary side to improve rectifying efficiency

DETAILED DESCRIPTION OF THE INVENTION

The preferred embodiment of this invention is shown in FIG. 5. The asymmetrical full bridge DC-to-DC converter includes an asymmetrical full bridge with a first, second, third, and fourth switching devices, hereinafter referred to as switches S1, S2, S3, S4, and a compensative capacitor Cp, a transformer with a primary winding and a secondary winding, and a rectification circuit which is connected at the secondary side of the transformer.

S1 and S4 form one leg of the full bridge; S2 and the element of S3 and Cp in series form the other leg of the full bridge. The primary winding of the transformer is connected with the center points of two legs. S1 and S2 are main switches, which conduct reflected output current and magnetizing current. S3 and S4 are auxiliary switches, which only conduct magnetizing current.

Main switches S1, S2 turn on and turn off synchronously, and auxiliary switches S3, S4 turn on and turn off synchronously also. Main switches and auxiliary switches turn on and turn off alternately. The turn-on time of main switches is the duty cycle time. The duty cycle of main switches is denoted as D, and the duty cycle of auxiliary switches is 1-D.

In secondary side two diodes D1, D2 together with output inductor L and output capacitor C2 form a rectification circuit to obtain ripple free DC voltage, while a synchronous rectifier may be applied instead for high efficiency in low voltage applications.

In another embodiment of this invention, which is shown in FIG. 6, the compensative capacitor Cp is connected in the branch circuit of auxiliary switch S4. The two configurations are equivalent completely. As an example, the configuration in FIG. 5 will be analyzed in following sections.

In one switching period, the voltage across the compensative capacitor Cp is almost constant. So Cp is replaced by a constant DC voltage source Vc in the equivalent circuit. FIG. 7 shows the equivalent circuit of the converter when main switches turn on and auxiliary switches turn off. FIG. 8 shows the equivalent circuit of the converter when main switches turn off and auxiliary switches turn on. FIG. 9 shows the key operation waveforms of the converter in one switching cycle. The operation waveforms will be described by following time intervals:

[t0, t1]

Referring to FIG. 7, at time t0, main switches S1, S2 turn on, and auxiliary switches S3, S4 remain OFF. The primary winding of the transformer is connected to the input voltage. The magnetizing current of the transformer increases linearly. The primary current, which is conducted by S1 and S2, is the sum of the reflected current of output and the magnetizing current. In secondary side, diode D1 turns on and feeds current to output inductor. The voltage stress of S4 is the input voltage of Vin, and that of S3 is Vin−Vc. In this process, the energy from input Vin is partly delivered to the load Vo, and partly stored in the output inductor.

[t1, t2]

At time t1, S1 and S2 turn off. Voltage of point A decreases and voltage of point B increases, the primary current Ip discharges the output parasitic capacitor of auxiliary switches S3 and S4. When the voltage of the primary winding Vp drops to zero, diode D1 turns off and the output current passes by diode D2. In primary side, the magnetizing current continuously discharges the auxiliary switches S3, S4. Finally S3 and S4 are discharged completely and the body diodes turn on, thus the reset voltage Vin−Vc is applied to the transformer primary winding.

[t2,t3]

Referring to FIG. 8, at time t2, auxiliary switches S3, S4 turn on under zero-voltage-switching condition. The reset voltage Vin−Vc applied to the transformer primary winding blocks the magnetizing current. The magnetizing current decreases linearly and finally reverses. In secondary side, D2 remains ON and D1 remains OFF, output current is conducted by D2. No reflected current appears in primary side, so auxiliary switches S3, S4 only conduct magnetizing current. In this process, switch S1 endures the voltage of Vin, and switch S2 endures the voltage of Vin−Vc. The energy stored in output inductor delivers to the load, and no energy transfers from primary side to secondary side.

[t3,t4]

At time t3, auxiliary switches S3, S4 turn off, the magnetizing current start to discharge the parasitic capacitance of main switches S1 and S2, thus the voltage of point A rises and that of point B falls. So the reset voltage of the transformer decreases, when the voltage of the primary winding Vp drops to zero and became positive, diode D1 turns on. Since the primary current is less than the reflected current of the output, diode D2 remains ON and conducts the output current. Therefore, diodes D1 and D2 both turn on and the voltage of the primary winding Vp is clamped near to zero.

At time t4, main switches S1 and S2 turn on, the input voltage Vin is applied to the transformer primary winding, and the primary current increases. When the primary current rises over than the reflected current of the output, diode D2 turns off, all of the output current is conducted by diode D1, a new switching cycle resumes.

In a steady operation, the relationship between reset voltage Vin−Vc and the duty cycle can be expressed as:

$$V_{in} - V_c = \frac{D}{1-D} \cdot V_{in} \quad (1)$$

The output voltage Vo can be expressed as:

$$V_o = \frac{V_{in}}{n} \cdot D \quad (2)$$

For well understanding of the operation of the asymmetrical full bridge DC-to-DC converter of this invention, the important operation features of this converter are described as following:

First, the relationship of output voltage to switching duty cycle is linearly. It is easy to regulate the output by adjusting the duty cycle, and the control loop is steady in the case of wide input voltage operation.

Second, the reset voltage is changeable. With the decrease of input voltage, the duty cycle increases, and the reset voltage increases; the reset time shortens. So the maximum duty cycle can be larger than 50% in low input. The duty cycle in the operation case of wide input voltage is maximized and the conversion efficiency is expected to be the best.

Third, there is no circulation current problem in primary side. When the main switches turn off, no output current reflects to the primary side, the primary current is only the magnetizing current, which is much lower than output current. So the RMS current in primary is minimized.

Fourth, the voltage stresses of switches S1 and S4 are equal to input voltage, and those of S2 and S3 are equal to reset voltage Vin−Vc. So low rated voltage switches can be used in this circuit. In other word, this circuit is suitable for the high input voltage application.

FIG. 10 and FIG. 11 show the further embodiments of this invention, in which an inductor in primary or a saturable inductor in secondary is used to obtain zero-voltage-switching condition for main switches.

As shown in FIG. 10, an inductor Lk, which can be an extra component or the leakage inductance of the transformer, is inserted in the transformer primary winding. It takes effect in the process between auxiliary switches turn-off and main switches turn-on. Referring to FIG. 12, when auxiliary switches S3, S4 turn off at time t3, the primary voltage of the transformer drops to zero and is clamped at zero due to the common turn-on of diodes D1 and D2. The energy stored in inductor Lk continuously discharges the parasitic capacitance of main switches S1 and S2, so the voltage of point A rises up to Vin and is clamped at Vin by its body diode; the voltage of point B drops to zero and is clamped at zero by its body diode. At time t4, the main switches S1 and S2 turn on under zero-voltage-switching condition.

In FIG. 11, a saturable inductor is inserted in secondary side. It also takes effect in the process between auxiliary switches turn-off and main switches turn-on to obtain zero-voltage-switching condition for main switches. When auxiliary switches S3, S4 turn off at time t3, the primary voltage of the transformer drops to zero and then became positive. A positive voltage applies to secondary side and intend to diode D1 turning on. Due to the present of the saturable inductor Ls, diode D1 delays to turn on. In this delay time magnetizing current continuously discharges the parasitic capacitance of main switches S1, S2 and obtains zero-voltage-switching condition.

FIG. 13 shows another embodiments of this invention, in which a center-tapped rectification circuit is used in secondary side. A tapping terminal in secondary winding divides the secondary winding into two windings, denoted as W1 and W2. W1 connects to D1 and W2 connects to D2. D1 and D2 connect to the output inductor and further connect to one terminal of the load. The other terminal of the load connects to the tapping terminal of the secondary winding.

FIG. 14 shows the key waveforms of this circuit. When the main switches turn on, D1 turns on, and the energy in primary side is transferred to output by winding W1. At the same time, the energy is stored in the transformer primary winding. When the main switches turn off, D2 turns on, and the energy stored in primary winding is transferred to output by winding W2. Referring to FIG. 14, the voltage $V_L$ that is across output inductor and output voltage is reflected voltage of input voltage Vin in main switches on time and that is reflected voltage of reset voltage Vin−Vc in transformer reset time. So output voltage ripple is reduced greatly. When duty cycle is 50%, reset voltage is equal to input voltage and the output voltage ripple is zero. A small inductor can be used in this circuit; the tradeoff for this circuit is that the magnetizing current of the transformer will generate a DC bias.

Although the present invention has been described in terms of the present embodiments, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

We claim:

1. An asymmetrical full bridge circuit used in a DC-to-DC converter comprising:

a first and fourth switching devices forming a first leg of said full bridge;

a second and third switching devices forming a second leg of said full bridge, said first and second switching devices constituting main switches, said third and fourth switching devices constituting auxiliary switches;

a capacitor connected in series to one of said auxiliary switching devices constituting a serially-connected-circuit in one of said legs of said full bridge;

a transformer having a primary winding and a secondary winding, said primary winding connected to a common point of said first and second legs of said full bridge; and wherein said first and second switching devices are turned on simultaneous with a duty cycle time and transfer energy from the primary winding to the secondary winding while said third and fourth switching devices are turned off and alternately when the first and second switching devices are turned off, said third and fourth switching devices are turned on and reset the transformer.

2. The circuit of claim 1 wherein said capacitor is connected in series with the third switching device constituting a series part of said second leg of said full bridge.

3. The circuit of claim 1 wherein said capacitor is connected in series with the fourth switching device constituting a series part of said first leg of said full bridge.

4. The circuit of claim 1 further comprising:

an extra inductor connected in series with said primary winding of said transformer.

5. The circuit of claim 1 further comprising:

an extra inductor connected in series with said secondary winding of said transformer.

6. An asymmetrical full bridge DC-to-DC converter comprising:

a full bridge circuit including first and fourth switching devices constituting a first leg of said full bridge and a second and third switching devices constituting a second leg of said full bridge, said first and second switching devices being main switches, said third and fourth switching devices being auxiliary switches;

a capacitor connected in series to one of said auxiliary switching devices constituting a serially-connected-circuit in one of said legs of said full bridge;

a transformer having a primary winding and a secondary winding, said primary winding connected to a common point of said first and second legs of said full bridge;

a rectification circuit connected to said secondary winding of the transformer for generating a rectified dc voltage output; and wherein said first and second switching devices are turned on simultaneous with a duty cycle time and transfer energy from the primary winding to the secondary winding while said third and fourth switching devices are turned off and alternately when the first and second switching devices are turned off, said third and fourth switching devices are turned on and reset the transformer.

7. The DC-to-DC converter of claim 6 wherein said capacitor is connected in series with the third switching device constituting a series part of said second leg of said full bridge.

8. The DC-to-DC converter of claim 6 wherein said capacitor is connected in series with the fourth switching device constituting a series part of said first leg of said full bridge.

9. The DC-to-DC converter of claim 6 further comprising:

an extra inductor connected in series with said primary winding of said transformer.

10. The DC-to-DC converter of claim 6 further comprising:

an extra inductor connected in series with said secondary winding of said transformer.

11. The DC-to-DC converter of claim 6 wherein:

said rectification circuit includes a first and a second rectifier and an inductor for turning on and off in synchronizing with said main switching devices for generating said rectified output voltage.

12. The DC-to-DC converter of claim 11 wherein:

said secondary winding of said transformer has a first and a second terminals and a tapping point for turning on said main switching devices to energize said first terminal and said tapping point to said inductor through said first rectifier and for turning off said main switching devices to energize said second terminal and said tapping point to said inductor through said second rectifier.

13. The DC-to-DC converter of claim 11 wherein said rectifiers comprising passive diodes.

14. The DC-to-DC converter of claim 12 wherein said rectifiers comprising passive diodes.

15. The DC-to-DC converter of claim 11 wherein said rectifiers comprising active switches.

16. The DC-to-DC converter of claim 12 wherein said rectifiers comprising active switches.

* * * * *